April 19, 1960     H. G. SCHURECHT     2,933,552
COMPOSITE GLASS SEAL

Filed June 6, 1955                         4 Sheets-Sheet 1

INVENTOR.
Harry G. Schurecht
BY Owen & Owen
ATTORNEYS

April 19, 1960     H. G. SCHURECHT     2,933,552
COMPOSITE GLASS SEAL
Filed June 6, 1955     4 Sheets-Sheet 2
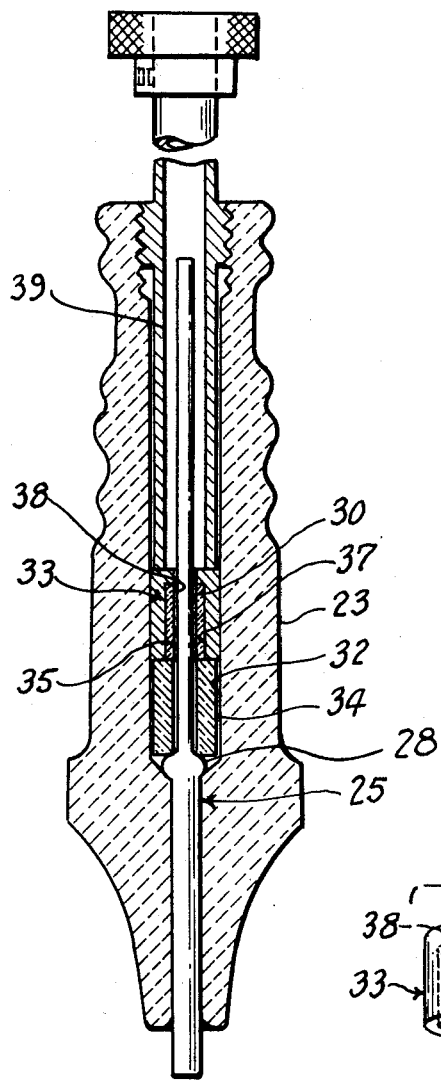
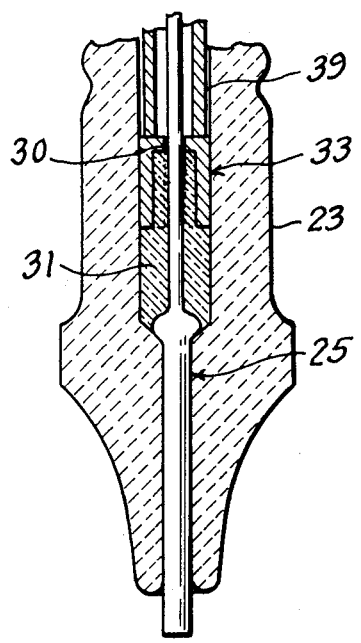
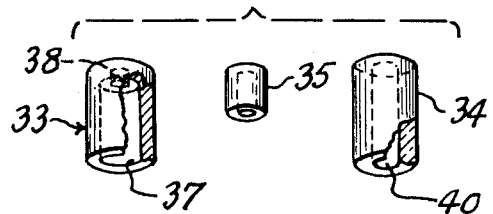
INVENTOR.
Harry G. Schurecht
BY Owen & Owen
ATTORNEYS April 19, 1960 H. G. SCHURECHT 2,933,552
COMPOSITE GLASS SEAL
Filed June 6, 1955 4 Sheets-Sheet 3
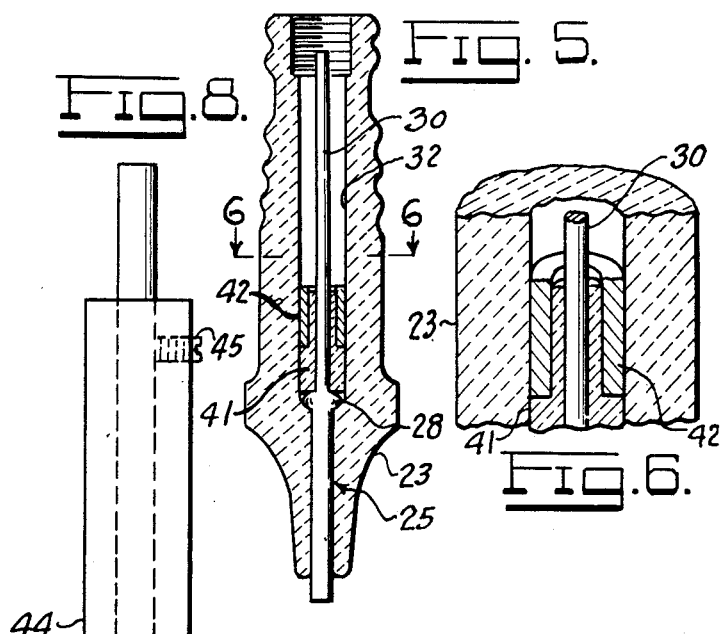
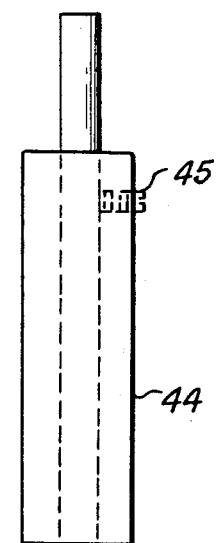
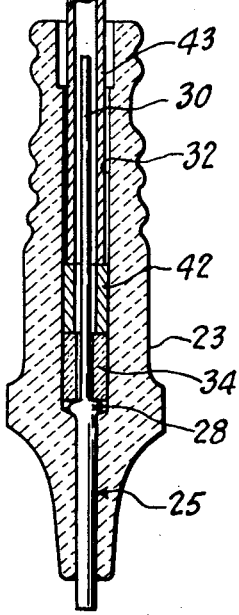
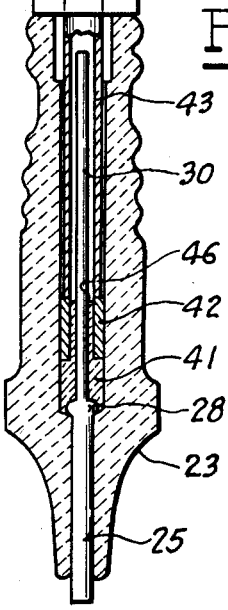
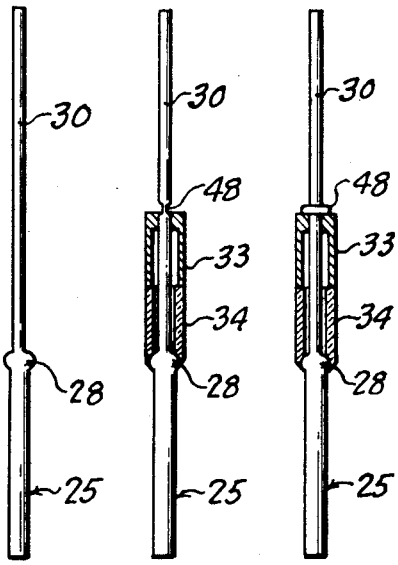
INVENTOR.
Harry G. Schurecht
BY Owen & Owen
ATTORNEYS April 19, 1960  H. G. SCHURECHT  2,933,552
COMPOSITE GLASS SEAL
Filed June 6, 1955  4 Sheets-Sheet 4
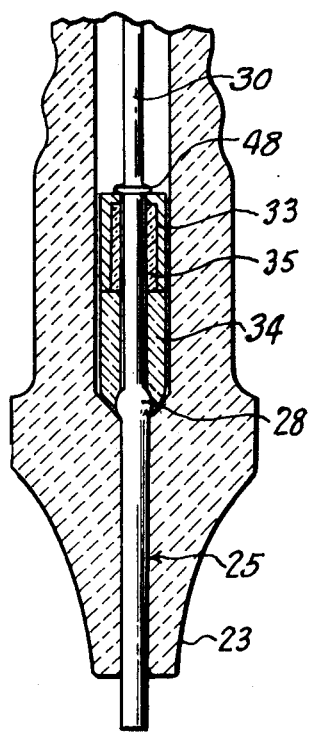
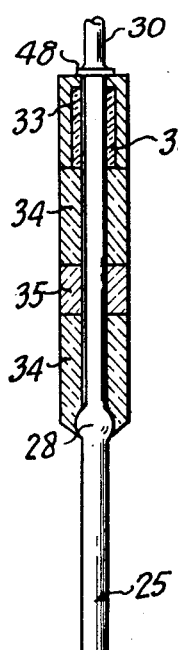
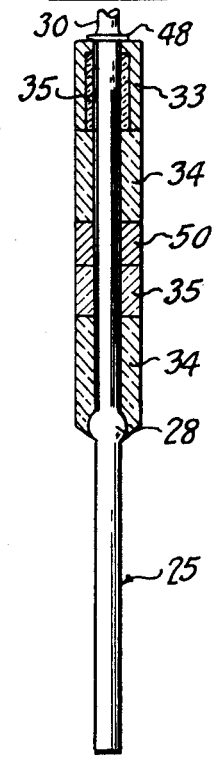
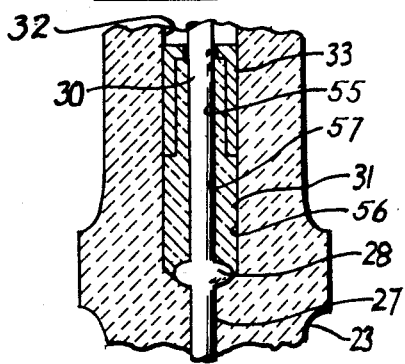
INVENTOR.
Harry G. Schurecht
BY Owen & Owen
ATTORNEYS United States Patent Office 2,933,552
Patented Apr. 19, 1960

2,933,552

COMPOSITE GLASS SEAL

Harry G. Schurecht, Detroit, Mich., assignor to Champion Spark Plug Company, Toledo, Ohio, a corporation of Delaware Application June 6, 1955, Serial No. 513,268

9 Claims. (Cl. 174—152)

This invention relates to a composite glass seal between ceramic and metallic parts of spark plugs and, more particularly, to such seals between the center electrode and the ceramic insulator of a spark plug wherein a ring, piston, or the like, usually of metal, is incorporated in the upper portion of the seal.

Various suggestions have heretofore been made concerning glass compositions for use in effecting a seal between a ceramic and a metallic part of a spark plug. For example, the incorporation of copper-metal powder for the purpose of rendering seals electrically conducting, and admixture with the glassy sealing material of a powder produced by grinding the ceramic insulator to which the seal must bond, have been suggested. The use of two pellets of sealing material, the one nearer the nose or firing end of the plug being less plastic than the other has also been suggested, and is alleged to have the advantage of minimizing the possibility that heat from the combustion chamber of an associated internal combustion engine will soften the seal.

Although various techniques have been suggested for effecting seals using these compositions, there is general agreement in the published literature that the sealing composition must be compressed in some way. For example, the suggestion has been made that a plug be screwed into the upper portion of a spark plug insulator so that a portion of a center electrode is surrounded, and the sealing composition confined thereby, and then heating the assembly to fuse the seal. It has also been suggested that an upper electrode part be threaded into a ceramic core above a sealing composition, that the assembly be heated, and that the necessary mechanical pressure be applied by tightening this upper electrode part against the sealing composition while the latter is in a fused condition. According to a slightly modified version of the last described process the upper electrode part is not threaded into the ceramic core, but is seated against the fused sealing material by mechanical pressure applied to its upper part.

My co-pending application Serial No. 447,792, entitled "Spark Plug Seal," filed August 4, 1954, now Patent No. 2,898,395, of which this is a continuation-in-part, describes an improved method for effecting a seal. According to the improved method, a sealing material which expands upon heating in an insulator is packed in place, a holding powder or other confining means is packed over the sealing material, and the resulting assembly is then fired to effect the seal.

So far as is known, no process that has heretofore been suggested, except that the identified copending application, makes possible a tight seal around any but very thin electrode wires that extend through the seal. The most common wires employed to pass through the seal in the spark plug assemblies for modern day internal combustion engines are made of tungsten or molybdenum. It will be apparent that the expense of such a conductor is substantial, and that when molybdenum is used special precaution must be taken to protect the exposed parts thereof against oxidation at the temperatures necessary to effect sealing. More reliable seals have also been produced around relatively fine (.015") conductors by all previously known techniques.

The present invention is based upon the discovery of an improved glass seal which is considered to be composite in nature. In one aspect the invention contemplates a glass seal around ordinary iron wire, and even such wire of relatively large diameter.

It is therefore an object of the invention to provide an improved glass seal.

It is a further object of the invention to provide an improved method for effecting a glass seal.

It is still another object to provide a glass seal around an electrode wire composed of an inexpensive metal.

Other objects and advantages of the invention will be apparent from the description which follows, reference being had to the accompanying drawings, in which—

Fig. 2 is a vertical sectional view showing a step in one method for producing a seal according to the invention;

Fig. 3 is a fragmentary, vertical sectional view showing the assembly of Fig. 2 after a firing step which forms a seal according to the invention;

Fig. 4 is a view in perspective showing, on an enlarged scale, components of the assembly of Fig. 2;

Fig. 5 is a vertical sectional view similar to Fig. 2 showing a step in a modified method for producing a seal according to the invention;

Fig. 6 is an enlarged view in perspective along the line 6—6 of Fig. 5;

Fig. 7 is a vertical sectional view showing a step in the formation of a seal from the assembly of Fig. 5;

Fig. 8 is a vertical sectional view showing the assembly of Fig. 7 after a heating step which forms a seal according to the invention;

Fig. 9 is a view in vertical elevation of an electrode;

Fig. 10 is a vertical elevational view, with parts shown in section, of an assembly produced from the electrode of Fig. 9;

Fig. 11 is a view in vertical elevation showing the assembly of Fig. 10 from a different angle;

Fig. 12 is a fragmentary vertical sectional view showing the assembly of Fig. 10 in place in an insulator ready for a heating step to form a seal according to the invention;

Fig. 13 is a view in vertical elevation, with parts shown in section, of a modified assembly similar to that of Fig. 10;

Fig. 14 is a vertical elevation, with parts shown in section, of a still further modified assembly similar to Figs. 10 and 13; and Fig. 15 is a fragmentary view in section on an enlarged scale of the seal of Fig. 1.

Figure 1:
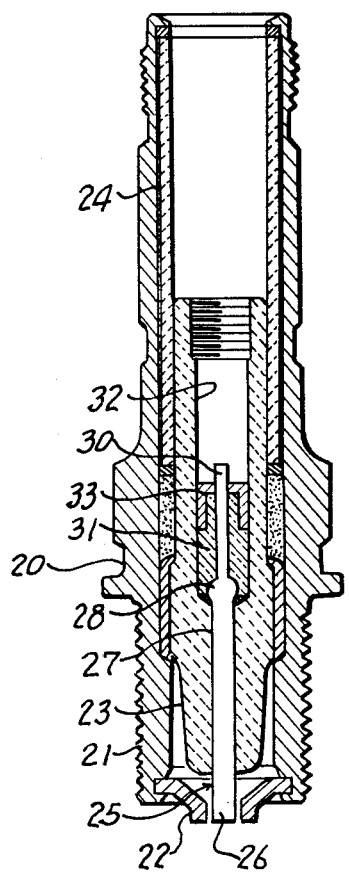
Fig. 1 is a view in vertical section of a spark plug including a seal according to the invention.

Referring now in more detail to the drawings, a typical spark plug including a seal according to the invention, as shown in Fig. 1, comprises a shell 20 threaded as at 21 for engagement with the cylinder head of an internal combustion engine, and carrying a shell electrode 22. An insulator 23 is seated and fixed in the shell by a bushing member 24 and supports a center electrode indicated generally at 25 having a firing tip 26 in the usual cooperating relation with the shell electrode 22.

The electrode 25, above its firing tip, comprises a stem part 27 received in the bore of the insulator, an enlarged shoulder 28, and an upper electrode portion 30. A seal 31 according to the invention surrounds a part of the upper electrode portion 30 in a bore 32 of the insulator 23, and also fills an annular space between the upper electrode portion 30 and a cup-shaped member 33.

Referring now to Fig. 2, the first step in producing a seal as shown in Fig. 1, according to one embodiment of the invention, involves inserting the electrode 25, a pellet 34 of a sealing material, a pellet 35 of a wetting agent, and a cup-shaped member 33 in the bore 32 of the insulator 23. The pellet 34 is supported by the shoulder 28 of the electrode, while the cup-shaped member 33 and the pellet 35 are supported on the upper surface of the pellet 34, the latter substantially filling an annular space between the upper electrode part 30 and a wall 37 of the cup-shaped member. There is a small annular space between the upper electrode part 30 and a wall 38 of the cup-shaped member. A tubular member 39 is then threaded into the insulator 23 until its lower surface contacts the upper surface of the cup-shaped member 33.

After the assembly has been completed, as shown in Fig. 2, heat is applied to soften the pellets 34 and 35. The pellet 34 must be one which, upon such heating, expands into a vesicular structure and occupies, after cooling, a volume greater than that of the original pellet.

The pellet 35 of a wetting agent should be a material which has a lower softening temperature than the sealing composition of the pellet 34. Excellent results have been achieved using, as wetting agents, lead borate and various low melting glasses. As heating is carried out to effect the seal, the pellet 35 of wetting agent material first softens and flows downwardly from the position represented in Fig. 2 around the electrode and probably also around the inner surface 32 of the insulator. The pellet 34 then softens, with further heating, and expands into the void left by the pellet 35, as well as against the wall 32 of the insulator. The tubular member 39 prevents the cup-shaped member 33 from being forced upwardly by the expansion of the pellet 34 during such heating step. The structure after the heating step, with the pellet 34 expanded into a seal, is shown in Fig. 3.

A ceramic insulator is more readily wet by a sealing composition than is an electrode or conductor, so that forming a tight seal against the bore 32 of the insulator 23 is relatively easier than is forming a tight seal against the surface of the upper electrode part 30. However, the method of the invention also facilitates sealing against the bore 32. The entire mass of sealing material, while in a softened condition, as described, expands under confinement between the shoulder 28 of the electrode 25 and the cup-shaped member 33. Such expansion, under confinement, forces the softened sealing material into intimate contact with the bore 32 of the insulator, thus facilitating a seal with such surface. It has been found that the use of a wetting agent also assists sealing around the bore of the insulator. It is believed that the wetting agent, being substantially more fluid than the sealing composition at the temperature involved, also provides a thin liquid coating on the bore 32, and that this liquid film is highly compatible with the sealing material, and adherent to the insulator.

It has been observed experimentally that sealing compositions, in assemblies as shown in Fig. 1, are forced by their expansion, under confinement, into the relatively thin annular space between the cup-shaped member 33 and the bore of the insulator, as well as into the annular space between the wall 37 of the member 33 and the upper electrode part 30. The ultimate confinement of the sealing composition is partially attributed, therefore, to the resistance to its flow offered by these thin annular passages. Optimum results in the form of consistently tight seals have been achieved when the radial dimension of each of these annular passages has been from 0.003" to 0.005", and when the radial distance from the surface of the upper electrode part 30 to the surface 37 of the member 33 has been at least 0.020". It has been found that, in the most effective seals, the axial thickness of the material 31 is from about ⅛" to about ¼", and the maximum axial dimension of the member 33 is at least ¼₆", and ideally is about ¼".

A modified seal according to the invention is shown in Figs. 5 and 6 between an insulator 23 and an electrode 25. A glassy seal 41 surrounds a portion of the upper electrode part 30, in the bore 32 of the insulator, and a portion of the seal 41 is confined between a part of the upper electrode 30 and a cylindrical confining ring 42. The seal 41 can be formed by inserting a pellet of sealing material, a pellet of a wetting agent, and the ring 42, and then turning a tubular retainer downwardly until its lower surface engages the upper surface of the ring 42, and heating, as described.

The seal 41 can also be produced as shown in Figs. 7 and 8 by inserting in the bore 32 of the insulator 23, the electrode 25, a pellet 34 of sealing material, and the retainer 42, followed by a tubular member 43 which engages the upper surface of the confining ring 42. A weight 44 which is slidable upon the member 43, and locked in a predetermined position thereon by a set screw 45, forces the member 43, the retaining ring 42, and the pellet 34 downwardly against the enlarged shoulder 28 of the electrode. The entire assembly is then heated, or a flame is played on the exterior of the insulator 23 adjacent the pellet 34, to soften the sealing material. When the softening occurs, the force exerted by the weight 44 and the member 43 forces the retaining ring 42 into the sealing material, some of which is urged upwardly into an annular space between the upper electrode part 30 and an interior concentric surface 46 of the retaining ring 42, as shown in Fig. 8.

Where a cup-shaped member 36, or a tubular confining ring 42 is forced downwardly into a softened sealing composition, either by the action of a weight 44 as shown in Figs. 7 and 8, or by applying a force to the upper end of the tube 43 while the sealing material is in a softened condition, it has been found that the sealing material can be any material conventional for this use, for example a borosilicate glass, lead silicate glass, lead borosilicate glass, or other suitable glass, either containing or free of various materials that have been added to sealing materials. Where a cup-shaped member 33, or a tubular confining ring 42 is merely supported against upward movement in the bore of an insulator, for example as shown in Figs. 2 and 3, and previously discussed, or as shown in Figs. 9 through 12, and subsequently discussed, the sealing material must be one which, when heated to the temperature used in forming the seal, expands into a vesicular structure and occupies, after cooling, a volume greater than before such heating. A sealing material which expands in such manner upon heating can be produced by mixing calcined Bayer process alumina, bentonite, petalite, fused quartz, cordierite, tungsten metal powder, zinc oxide, tin oxide, sodium carbonate, lithium carbonate, whiting, talc, or other similar material with a sealing glass as disclosed in more detail in my previously identified co-pending application. Any of the sealing materials disclosed therein is suitable for use in producing seals of this type.

A subassembly particularly advantageous for producing seals according to the invention, using an expanding sealing material, is shown in Figs. 10 and 11. The assembly comprises the electrode 25, a sealing pellet 34 seated on the enlarged shoulder 28, and a cup-shaped member 33 resting on the pellet 34. The upper electrode portion 30 is crimped as indicated at 48, forming an enlarged shoulder in one plane which locks the cup-shaped member 33 against upward movement during a heating step, as described. Such an assembly can merely be placed in an insulator or a pellet 35 of a wetting agent can be included as shown in Fig. 12, and fired, for example in a kiln or by playing a flame on the exterior of the insulator adjacent the sealing material. The assembly of Fig. 12 is adapted for substantially automatic production of seals. An assembly similar to that shown in Figs. 10 and 11, but which has been found to be superior for forming reliable seals around nickel electrodes is represented in Fig. 13. The assembly comprises an electrode 25 with a pellet 34 of a sealing material positioned on the shoulder 28, a pellet 35 of a wetting agent above the pellet 34, a second pellet 34 above the pellet 35, and a cup-shaped member 33 above the second pellet 34. The electrode is crimped at 48 to lock the cup-shaped member 33 against upward movement from the position represented.

Still another particularly advantageous assembly is shown in Fig. 14. This assembly comprises the electrode 25, pellets 34, 35 and 34 with a metal or ceramic sleeve 50 interposed between the pellet 35 and the upper pellet 34, and a cup-shaped member 33 locked in position by a crimped portion 48. It is believed that the metal or ceramic sleeve 50 is advantageous because of its restriction of the annular space to be sealed in the bore of the insulator. It has been observed that, after the assembly of Fig. 14 has been placed in an insulator and fired, sealing material can be observed in the annular space between the exterior of the bushing 50 and the wall of the bore of the insulator, and also between the interior surface of the bushing 50 and the exterior surface of the electrode 25. Tight seals capable of withstanding a 1000 p.s.i. leakage test have been produced around heavy nickel upper electrode parts 30 from the assemblies of Figs. 13 and 14.

Where a pellet 35 of a wetting agent is used in producing seals according to the invention, such material can be lead borate, as previously discussed. Particularly advantageous results have been achieved when the wetting agent has been a low melting glass or has contained $MoO_3$. Best results thus far have been achieved with low melting glasses containing a high percentage of lead oxide, for example at least 50 percent by weight. Excellent results have been achieved with glasses identified in Table I, below, as glasses A and B in composition and percent by weight:

Table I

| Constituent | Glass A [1] | Glass B |
|---|---|---|
| PbO | 74.37 | 66.6 |
| $SiO_2$ | 3.77 | 23.5 |
| $Al_2O_3$ | 8.89 | 2.9 |
| $B_2O_3$ | 9.72 | 7.0 |

[1] The composition given for glass A represents actual analytical values determined upon quantitative analysis. This glass is commercially available under the trade designation No. 7570.

Excellent results have also been achieved using a pellet of $MoO_3$ as a wetting agent, as well as using a pellet of a commercially available frit of a silicate and molybdenum, tungsten, uranium, vanadium, or a compound of one of these metals. Such frits are discussed in detail in U.S. Patent 2,422,215. It has also been found that the wetting agent can be mixed with the sealing composition, if desired, for example in amounts ranging from 5 percent to 10 percent. The pellet or pellets 35 of wetting agent can then be eliminated from all assemblies where shown in the drawings.

The assemblies shown in Figs. 13 and 14 include wetting agent pellets 35 inside the cup-shaped members 33. It has been found that these pellets can be eliminated, and that tight seals are still consistently produced, even around nickel upper electrode parts or conductors.

Referring now especially to Fig. 15, the seal 31 is considered to be a double seal, in the sense that a particularly effective seal around the upper electrode portion 30 is formed by the portion thereof designated 55 inside the cup-shaped member 33, while a particularly effective seal with the bore of the insulator 23 is formed by the portion thereof designated 56 below the member 33. A third seal portion, designated by the numeral 57, adjacent the electrode portion 30, but below the cup-shaped member 33, is relatively less effective. As the assembly shown in Fig. 2 is heated to effect the seal, the pellet 34 expands to fill all voids inside the bore 32 between the shoulder 28 of the insulator 25 and the cup-shaped member 33. The member 33 is usually made of cold rolled steel stock, and has, therefore, a relatively high coefficient of thermal expansion. As a consequence, after the pellet 34 has expanded during the heating step, and as the entire assembly cools, the seal portion 55 is compressed tightly against the upper electrode portion 30 by virtue of contraction of the member. In previously suggested seals, it has been found that difficulty is frequently encountered because contraction of the conductor through the seal, during cooling, leaves a substantial void along its surfaces which provides an easy leakage path for gases. A seal according to the invention avoids this difficulty by positively compressing the portion 55 of sealing material against the conductor or electrode part that passes through the seal. The use of a wetting agent pellet is also advantageous in sealing around a conductor or upper electrode part because the agent forms a thin liquid layer on the conductor or electrode surface which wets that surface, and is compatible with, or easily wet by, the sealing material. Contraction of the electrode part 30 during cooling after firing makes the portion of the seal designated 57 relatively less effective. The portion 56 of sealing material is pressed against the base 32 by expansion under confinement, during firing, with the result that the seal portion 56 is consistently gas tight.

It will be apparent that various changes and modifications can be made from the specific details shown in the drawings without departing from the spirit of the attached claims. In its essential details, the method for producing a seal according to the invention between a ceramic material having a central bore and a metal part disposed in the bore and separated therefrom by an annular space, comprises inserting in the annular space between the parts a measured charge of a fusible, vitreous sealing material, confining at least an axially extending zone around the center electrode and adjacent the sealing material, heating at least the sealing material at least to its softening temperature, and effecting relative movement between the sealing material and the confined zone to force a portion of the former into the latter.

What I claim is:

1. An assembly for use in producing a spark plug which comprises, an electrode part having a lower electrode portion, a shoulder adjacent the lower portion, and an upper contact part, fusible, vitreous sealing means in pellet form positioned on said shoulder and surrounding a portion of said contact part, said sealing means being a composition which expands upon heating at least to its softening temperature and occupies, after cooling, a volume greater than before such heating, a confining member having a cylindrical portion axially aligned with and adjacent said sealing means, surrounding said contact part, and spaced therefrom to define therewith an annular space, and means locking said confining member against axial movement relative to said electrode part.

2. An assembly for use in producing a spark plug which comprises, an electrode part having a lower electrode portion, a shoulder adjacent the lower portion, and an upper contact part, a fusible, vitreous sealing means in pellet form positioned on said shoulder and surrounding a portion of said contact part, said sealing means being a composition which expands upon heating at least to its softening temperature and occupies, after cooling, a volume greater than before such heating, a confining member having a cylindrical portion axially aligned with and adjacent said sealing means, surrounding said contact part, and spaced therefrom, to define therewith an annular space, wetting means in pellet form disposed between said confining member and said sealing means, and effective, upon heating, to wet said electrode part, and means locking said confining member against axial movement relative to said electrode part.

3. An assembly as claimed in claim 2 in which the wetting means comprises a low melting glass.

4. An assembly as claimed in claim 3 in which the wetting means comprises lead borate.

5. An assembly as claimed in claim 3 in which the wetting means comprises $MoO_3$.

6. An assembly for use in producing a spark plug which comprises, an electrode part having a lower electrode portion, a shoulder adjacent the lower portion, and an upper contact part, fusible, vitreous sealing means in pellet form positioned on said shoulder and surrounding a portion of said contact part, said sealing means being a composition which expands upon heating at least to its softening temperature and occupies, after cooling, a volume greater than before such heating, a confining member having a cylindrical portion axially aligned with and adjacent said sealing means, surrounding said contact part, and spaced therefrom, to define therewith an annular space, a solid filler disposed between said confining member and said sealing means, and means locking said confining member against axial movement relative to said electrode part.

7. An assembly for use in producing a spark plug which comprises, an electrode part having a lower electrode portion, a shoulder adjacent the lower portion, and an upper contact part, fusible, vitreous sealing means in pellet form positioned on said shoulder and surrounding a portion of said contact part, said sealing means being a composition which expands upon heating at least to its softening temperature and occupies, after cooling, a volume greater than before such heating, a confining member having a cylindrical portion axially aligned with and adjacent said sealing means, surrounding said contact part, and spaced therefrom, to define therewith an annular space, a solid filler, wetting means in pellet form, and effective, upon heating, to wet said electrode part, said filler and said wetting means being disposed between said confining member and said sealing means, and means locking said confining member against axial movement relative to said electrode part.

8. An assembly for use in producing a spark plug which comprises, an electrode part having a lower electrode portion, a shoulder adjacent the lower portion, and an upper contact part, fusible, vitreous sealing means in pellet form positioned on said shoulder and surrounding a portion of said contact part, said sealing means being a composition which expands upon heating at least to its softening temperature and occupies, after cooling, a volume greater than before such heating, a confining member having a cylindrical portion axially aligned with and adjacent said sealing means, surrounding said contact part, and spaced therefrom, to define therewith an annular space, a solid filler, wetting means in pellet form, and effective, upon heating, to wet said electrode part, said filler and said wetting means being disposed between said confining member and said sealing means, and an offset in said contact part locking said confining member against axial movement relative to said electrode part.

9. An assembly for use in producing a spark plug which comprises, an electrode part having a lower electrode portion, a shoulder adjacent the lower portion, and an upper contact part, fusible, vitreous sealing means in pellet form positioned on said shoulder and surrounding a portion of said contact part, said sealing means being a composition which expands upon heating at least to its softening temperature and occupies, after cooling, a volume greater than before such heating, a confining member having a cylindrical portion axially aligned with and adjacent said sealing means, surrounding said contact part, and spaced therefrom to define therewith an annular space and a vent for escape of gas from the annular space, and means locking said confining member against axial movement relative to said electrode part.

References Cited in the file of this patent

UNITED STATES PATENTS

| | | |
|---|---|---|
| 732,812 | Anderson | July 7, 1903 |
| 1,848,312 | Bruzzone | Mar. 8, 1932 |
| 2,227,770 | Ungewiss | Jan. 7, 1941 |
| 2,317,305 | Schwartzwalder et al. | Apr. 20, 1943 |
| 2,321,840 | McDougal | June 15, 1943 |
| 2,367,445 | Stoltenberg | Jan. 16, 1945 |
| 2,463,577 | Stutsman | Mar. 8, 1949 |